(12) United States Patent
Mercer

(10) Patent No.: US 9,053,088 B2
(45) Date of Patent: Jun. 9, 2015

(54) DISPLAYING MNEMONIC ABBREVIATIONS FOR COMMANDS

(75) Inventor: Paul Mercer, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1407 days.

(21) Appl. No.: 12/060,081

(22) Filed: Mar. 31, 2008

(65) Prior Publication Data

US 2009/0249253 A1    Oct. 1, 2009

(51) Int. Cl.
*G06F 3/048*    (2013.01)
*G06F 17/27*    (2006.01)
*G06F 3/0481*    (2013.01)
*G06F 3/0489*    (2013.01)

(52) U.S. Cl.
CPC ............ *G06F 17/276* (2013.01); *G06F 3/0481* (2013.01); *G06F 3/0489* (2013.01)

(58) Field of Classification Search
CPC .............................. G06F 17/276; G06F 3/0489
USPC .......................................... 715/827, 254, 780
See application file for complete search history.

(56) References Cited

U.S. PATENT DOCUMENTS

| | | | | |
|---|---|---|---|---|
| 4,591,967 A * | 5/1986 | Mattes et al. | ...................... | 700/3 |
| 5,530,869 A * | 6/1996 | Salle | .............................. | 717/113 |
| 5,611,066 A * | 3/1997 | Keele et al. | ..................... | 711/100 |
| 5,623,667 A * | 4/1997 | Golshani et al. | ............... | 717/138 |
| 5,761,689 A * | 6/1998 | Rayson et al. | ................. | 715/210 |
| 5,774,859 A * | 6/1998 | Houser et al. | ................. | 704/275 |
| 5,845,300 A * | 12/1998 | Comer et al. | .................. | 715/203 |
| 6,012,086 A * | 1/2000 | Lowell | ........................... | 709/218 |
| 6,377,965 B1 * | 4/2002 | Hachamovitch et al. | ...... | 715/203 |
| 6,583,798 B1 * | 6/2003 | Hoek et al. | ...................... | 715/822 |
| 6,631,501 B1 * | 10/2003 | Jurion et al. | ................... | 715/257 |
| 6,684,211 B1 * | 1/2004 | Nguyen | ................................ | 1/1 |
| 7,010,616 B2 | 3/2006 | Carlson et al. | | |
| 7,624,019 B2 * | 11/2009 | Andrew | ......................... | 704/275 |
| 7,836,044 B2 * | 11/2010 | Kamvar et al. | ................ | 707/713 |
| 2002/0010639 A1 * | 1/2002 | Howey et al. | .................... | 705/26 |
| 2002/0109737 A1 * | 8/2002 | Jaeger | ............................ | 345/863 |
| 2002/0152204 A1 * | 10/2002 | Ortega et al. | ...................... | 707/3 |
| 2003/0018765 A1 * | 1/2003 | Muhlestein et al. | ........... | 709/223 |
| 2004/0163035 A1 * | 8/2004 | Ariel et al. | ...................... | 715/500 |

(Continued)

OTHER PUBLICATIONS

Boswell, Wendy, YubNub web search command line, Lifehacker, available at http://lifehacker.com/275460/yubnub-web-search-command-line (Jul. 9, 2007).*

*Primary Examiner* — Doon Chow
*Assistant Examiner* — Conrad Pack
(74) *Attorney, Agent, or Firm* — Mahamedi Paradice LLP

(57) ABSTRACT

Abbreviations are displayed for user-entered text commands, to facilitate discovery of keyboard shortcuts and to reinforce branding. Users enter commands by typing them into a text input field. Commands can be provided in a verb-noun structure, where the verb specifies what is to be done and the noun specifies the object or a parameter for the verb. Upon user entry of a command, or portion thereof, the entered portion is replaced by an abbreviation. The abbreviation can represent a single key, key combination, or multi-character string. The abbreviation can also include a logo or other graphic component, if desired. The abbreviation can replace the verb portion of the entered command, or it can be shown alongside or adjacent to the text input field, or it can be shown in an overlay or according to any other mechanism. A transition effect can be performed when introducing the abbreviation.

18 Claims, 10 Drawing Sheets

(56) References Cited

U.S. PATENT DOCUMENTS

| | | | |
|---|---|---|---|
| 2004/0216138 A1* | 10/2004 | Pankovcin et al. | 719/320 |
| 2005/0091586 A1* | 4/2005 | Snover et al. | 715/517 |
| 2006/0224680 A1* | 10/2006 | Terayoko | 709/206 |
| 2006/0259876 A1* | 11/2006 | Denissen et al. | 715/856 |
| 2007/0038616 A1* | 2/2007 | Guha | 707/4 |
| 2007/0239631 A1* | 10/2007 | Wang | 706/12 |
| 2008/0177858 A1* | 7/2008 | Aarnio et al. | 709/217 |
| 2008/0216022 A1* | 9/2008 | Lorch et al. | 715/847 |
| 2009/0055738 A1* | 2/2009 | Acedo et al. | 715/708 |
| 2009/0172541 A1* | 7/2009 | Acedo et al. | 715/708 |
| 2010/0179991 A1* | 7/2010 | Lorch et al. | 709/206 |

\* cited by examiner

DISPLAYING MNEMONIC ABBREVIATIONS FOR COMMANDS

FIELD OF THE INVENTION

In various embodiments, the present invention relates to user interfaces that include text entry of commands, and more particularly to techniques for displaying mnemonic abbreviations, such as keyboard shortcuts, for user-entered commands.

DESCRIPTION OF THE RELATED ART

Many conventional user interfaces provide several ways to access and activate commands. In some user interfaces, commands can be activated from a menu, by using a pointing device to cause an onscreen cursor to open a menu and to select a command from the open menu. The pointing device can be a mouse, trackball, touch-sensitive screen, or the like. Some user interfaces include on-screen buttons or icons that can be activated by using a pointing device and an onscreen cursor. Some user interfaces provide a command-line interface, wherein a user types a text command in an input field. Some user interfaces provide keyboard shortcuts wherein a command can be activated by striking a key or key combination (for example control-C to activate a Copy command).

Each such technique carries its own particular advantages and disadvantages, and many user interfaces offer two or more mechanisms to activate commands so that users can choose which mechanism to use in each individual situation or context. Some user interfaces are better suited to particular types of devices and form factors. For example, a touch screen based interface may be better adapted to a device having a large display screen, as users may find it difficult to activate on-screen buttons on small display screens.

For example, menu selection provides a way to conserve screen real estate, since commands are hidden from view until the user activates the menu; also, this technique provides a way to organize large sets of commands in a hierarchical arrangement. However, menu selection is slower than other command activation mechanisms, since the user must perform two (or more) actions to open a menu and activate the command. Also, it can be difficult for a user to remember which menu contains a given command.

On-screen buttons or icons are quicker to activate because they typically require just a single click. However, they take up room on the screen and can be inscrutable (for example, if the icons are small or unclear or if the underlying command does not map well to a name or image). In addition, on-screen buttons and icons are often haphazardly placed, without being organized effectively, and can require effort on the part of the user if the buttons or icons are small and difficult to point to or click on.

Command-line or text-box interfaces, where a user types a command in an input field, can be effective when screen real estate is at a premium and/or a large (and/or extensible) set of commands and parameters are available. Command-line interfaces are also useful in certain specialized applications where users tend to have a high level of expertise and familiarity with the system or application.

Command-line interfaces are also useful in the context of web-based information retrieval, as many search engines (such as Google) are now able to parse queries and perform certain commands when appropriate.

A particular difficulty with command-line interfaces is that users can have difficulty discovering which commands are available in a particular context. They may also have difficulty remembering particular spellings and syntaxes. Also, command-line interfaces often fail to provide sufficient feedback to confirm that a command has been entered correctly.

Keyboard shortcuts are often the fastest way to activate a command, and many "power users" tend to gravitate toward keyboard shortcuts once they become more familiar with a particular application or environment.

However, it can be difficult for users to discover keyboard shortcuts in certain contexts. It is well known to display keyboard shortcuts as part of a pull-down menu item; for example, a "Copy" menu item may indicate the corresponding "Ctrl-C" keyboard shortcut, so that the user can discover and/or remember the keyboard shortcut for next time. Tooltips can provide a similar function in the context of on-screen buttons or icons.

However, other command input paradigms do not provide an easy path for learning about keyboard shortcuts. Thus, for example, a command-line or text-box interface does not provide an easy mechanism for learning about a corresponding keyboard shortcut.

What is needed is a system and method for revealing keyboard short-cuts to users when they enter a command in a command-line or text-box interface. What is needed is a system and method that performs this function in an intuitive manner that does not interfere with the user's operation of the system. What is further needed is a system and method that reinforces the user's entered command and provides reassurance that the correct command and/or syntax has been entered.

SUMMARY OF THE INVENTION

In various embodiments, a command-line interface is provided. Users can enter commands by typing them into a text input field. Commands can be provided in a verb-noun structure, if appropriate, where the verb specifies what is to be done and the noun specifies the object or a parameter for the verb.

According to embodiments of the present invention, an abbreviation is displayed so that the user can discover a keyboard shortcut. The abbreviation can represent a single key, key combination, or multi-character string. The abbreviation can also take the form of a logo or other graphic component, or a combination of text and graphics, if desired.

In various embodiments, the abbreviation can replace the verb portion of the entered command, or it can be shown alongside or adjacent to the text input field, or it can be shown in an overlay, tooltip, or according to any other mechanism. In some embodiments of the invention, a transition effect is performed when introducing the abbreviation.

As described in more detail below, the abbreviation can be shown, in various embodiments, when the user finishes entering the command in the text input field, or when the user finishes entering the verb portion of the command, or when the user has entered enough of the command that the command can be unambiguously discerned from the entered portion.

Display of the abbreviation serves several purposes. In some embodiments, it provides visual feedback to reassure the user that the command was entered correctly. In other embodiments, it also reveals a keyboard shortcut to the user, so that the user can employ the keyboard shortcut in the future if desired. In embodiments where the abbreviation replaces the entered command, the abbreviation can save space in the text input field, thus allowing for more space for the user to enter the noun portion of the command. In embodiments where the abbreviation has a graphical component, the abbreviation can serve to reinforce branding (for example for a website, e-commerce retailer, service, or the like).

BRIEF DESCRIPTION OF THE DRAWINGS

The accompanying drawings illustrate several embodiments of the invention and, together with the description, serve to explain the principles of the invention according to various embodiments. One skilled in the art will recognize that the particular embodiments illustrated in the drawings are merely exemplary, and are not intended to limit the scope of the present invention.

DETAILED DESCRIPTION OF THE EMBODIMENTS

In various embodiments, the present invention can be implemented on any electronic device, such as a handheld computer, personal digital assistant (PDA), personal computer, kiosk, cellular telephone, and the like. For example, the invention can be implemented as a command interface paradigm for a software application or operating system running on such a device. Accordingly, the present invention can be implemented, in one embodiment, as part of a graphical user interface for controlling software on such a device.

In various embodiments, the invention is particularly well-suited to devices such as PDAs, which have limited screen space and wherein keyboard shortcuts and text-based input may be more feasible than extensive use of menus and on-screen buttons. In addition, the invention is well-suited to applications such as web browsers, where users may wish to access a few websites relatively often but with different parameters; the websites can be identified as verbs and the parameters can be identified as nouns. Thus, for example, accessing a Wikipedia page about Toronto might be entered as "wiki toronto", where the first word corresponds to the web page ("wikipedia.org") that the user may use relatively often, and the second word corresponds to the noun, or parameter, ("toronto") to be entered or searched at the web page.

One skilled in the art will recognize, however, that the invention can be practiced in many other contexts, including any environment in which it is useful to provide keyboard shortcut indicators (or other types of indicators) for commands entered in a text input field. Accordingly, the following description is intended to illustrate the invention by way of example, rather than to limit the scope of the claimed invention.

Figure 1:
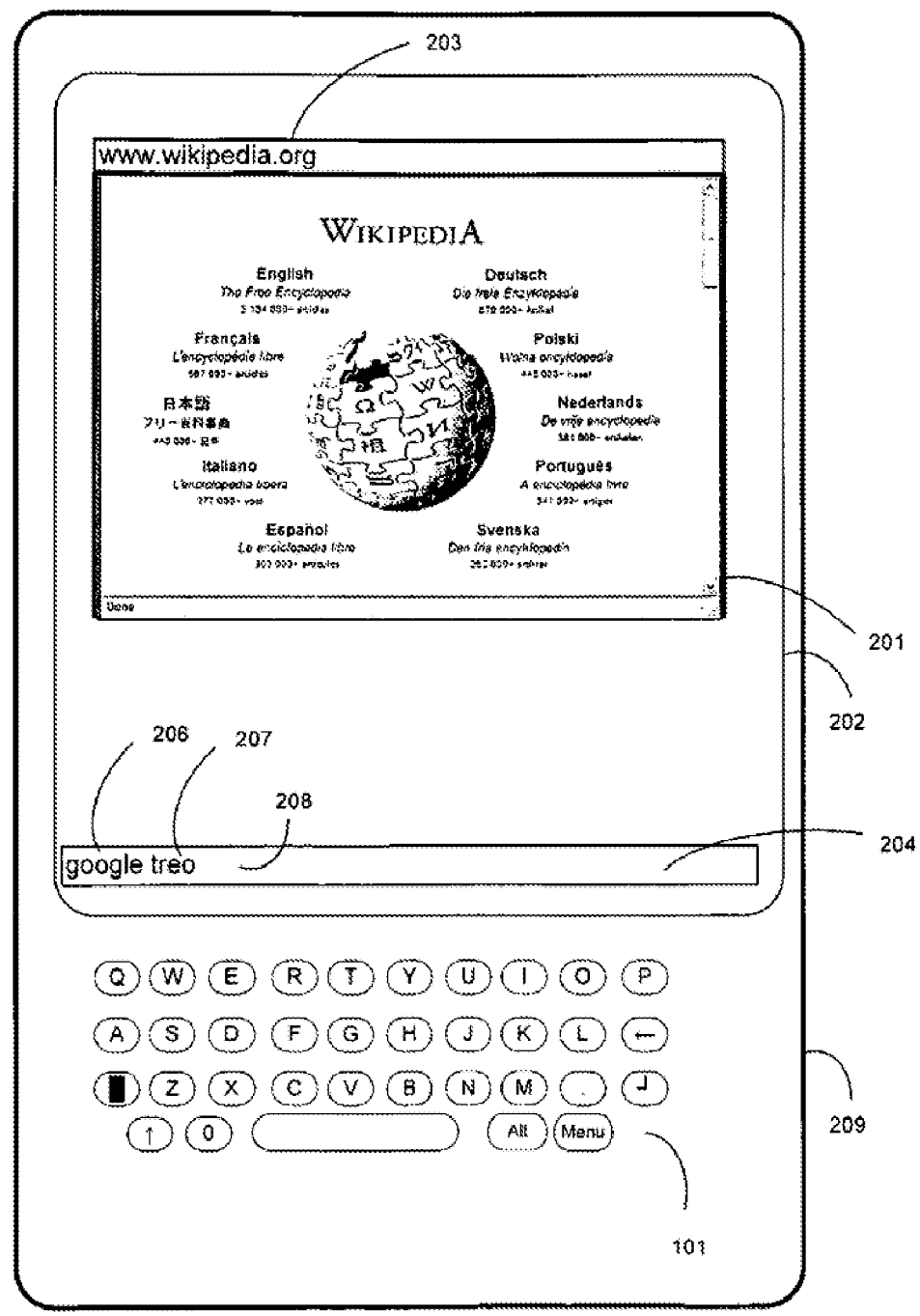
FIGS. 1 and 2 depict an example of displaying a graphical abbreviation in response to user entry of a command in a text input field on a personal digital assistant (PDA), according to one embodiment of the invention.
Figure 2:
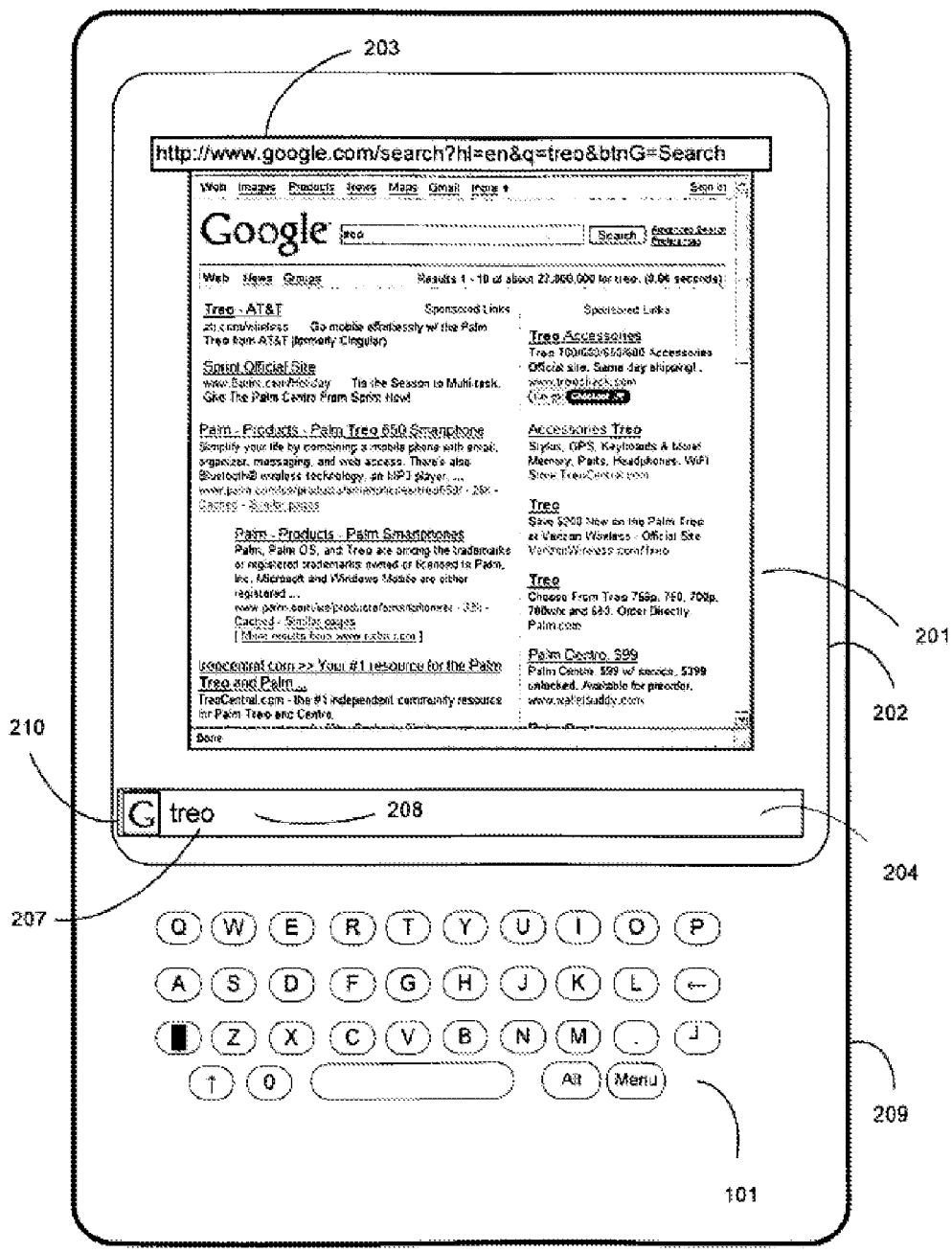

Referring now to FIGS. 1 and 2, there is shown an example of displaying a graphical abbreviation in response to user entry of a command in a text input field 204 on a personal digital assistant (PDA) 209, according to one embodiment of the invention. For illustrative purposes, these Figures depict the invention as it might be used in conjunction with operation of a web browser. The display screen 202 of the PDA 209 includes a browser window 201 showing a web page, a title bar 203 showing the uniform resource locator (URL) or title of the currently-viewed web page, and a text input field 204 for user input of keyboard-based commands. The PDA 209 also includes a keyboard 101 for entry of text, including text-based commands. The keyboard 101 can be an actual physical keyboard with buttons. Alternatively, the keyboard 101 can be implemented as a set of on-screen buttons shown on the display screen 202; in such an embodiment, the display screen 202 can be touch-sensitive according to techniques that are well known in the art.

The user presses keys on the keyboard 101 to enter a text-based command consisting of a series of characters. As each key is pressed, the corresponding character appears in the text input field 204. The user can indicate that he or she is finished entering a command by hitting a return key, or by tapping a particular location on the screen 202, or by pausing for some period of time, or by any other mechanism. In the example shown in FIG. 1, the user has entered the command "google treo" 208, which is intended to instruct the browser to perform a search at www.google.com for the word "reo" and to display the result or results. If the browser is not already open, such a command 208 can cause the browser to open, go to the indicated website, and perform the specified search. Thus, the command 208 can be thought of as including an action, or verb component ("google") 206, and a parameter, or object, or noun component ("treo") 207. The verb 206 specifies what is to be done ("perform a search at google") and the noun 207 specifies what to do the command on or with ("search for treo").

FIG. 2 shows the display screen 202 after the command 208 has been performed. The browser window 201 now shows the Google results page for the user's query. In FIG. 2, the text input field 204 now shows an abbreviation 210 consisting of a stylized "G" (representing the Google logo), instead of the user-entered verb "google" 206. In one embodiment, the replacement of the user-entered verb 206 by the abbreviation 210 takes place substantially simultaneously with performance of the command. In another embodiment, the replacement of the user-entered verb 206 by the abbreviation 210 takes place just before the command is performed, or just after the command is performed. Alternatively, the replacement can take place in response to the user completing the verb portion 206 of the command, as described in more detail below.

Figure 3:
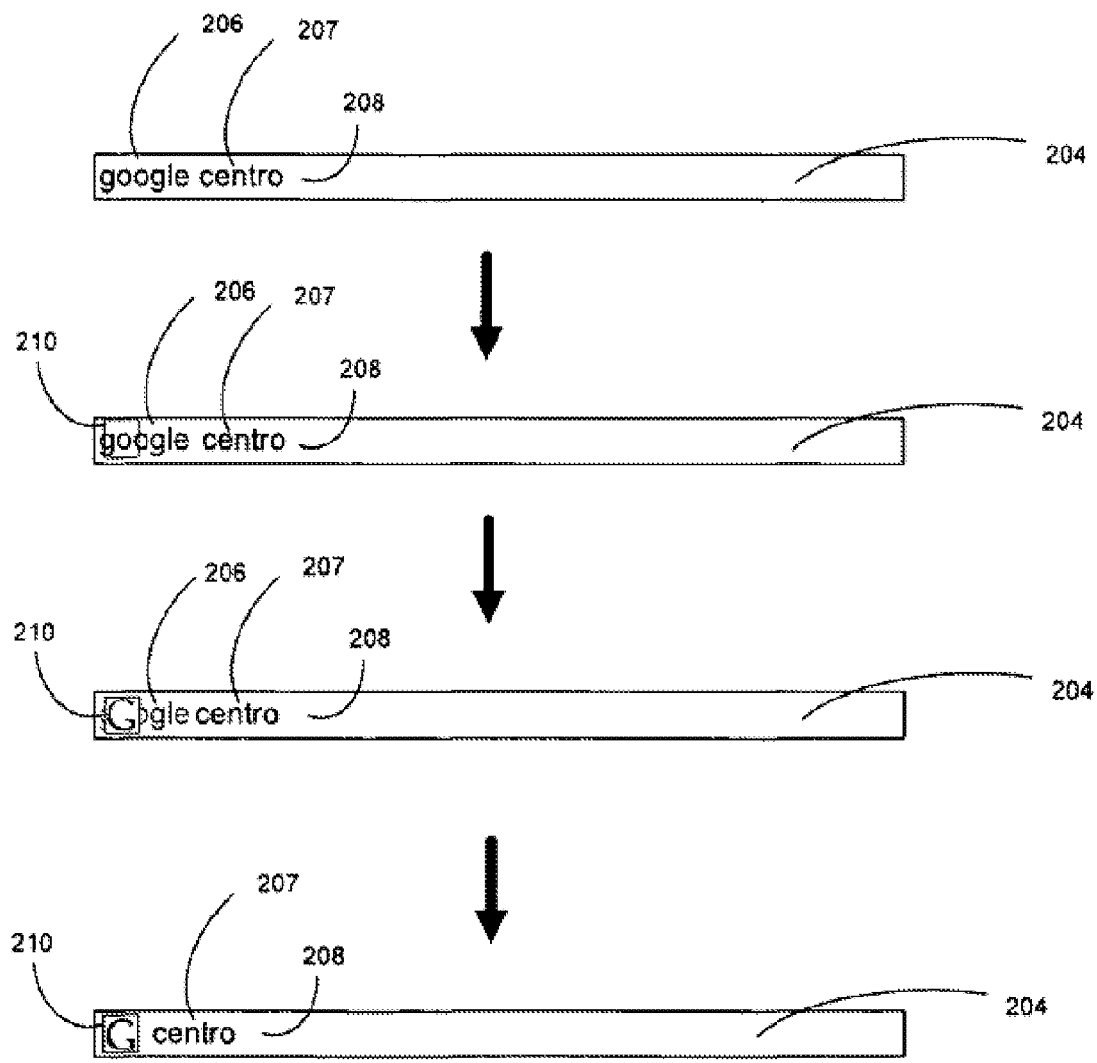
FIG. 3 depicts an example of displaying a graphical abbreviation in response to user entry of a command in a text input field including a transition effect, according to one embodiment of the invention.

Replacement of the user-entered verb 206 by the abbreviation 210 can be accompanied by a transition effect. Referring now to FIG. 3, there is shown an example of an embodiment of the present invention where such an effect is used. The user-entered command 208 shown in text input field 204 includes the verb "google" 206 and the noun "centro" 207. A gradual transition takes place, wherein the verb 206 fades from view, to be replaced by an abbreviation 210 consisting of a stylized "G" (representing the Google logo). As the verb 206 fades out, the abbreviation 210 fades in. This transition effect can take place over any desired period of time, such as a fraction of a second or longer if desired. In some embodiments, the transition takes place before, during, or after execution of the specified command.

In some embodiments, the noun 207 portion of the command 208 moves over as verb 206 is replaced by the abbreviation 210. This preserves an aesthetically consistent spacing between the two components of the command 208, and also provides more room in text input field 204 for additional text, parameters, and the like. Although moving the noun 207 in this manner is optional, it can yield more efficient use of space on the device's display screen.

One skilled in the art will recognize that many other types of transition effects can be used. For example, the verb 206 can condense into the abbreviation 210, or can morph into the abbreviation 210. Transition effects can also be turned on or off according to the wishes of the user or administrator.

In one embodiment, the user can tap or click on the abbreviation 210, or perform some other command, to restore the display of the verb 206. Repeatedly performing this action can cause the display to toggle between the abbreviation 210 and the verb 206.

In an alternative embodiment, the abbreviation 210 does not replace the verb 206, but is shown in addition to the verb 206. In such an embodiment, the abbreviation 210 can be shown adjacent to or proximate to the verb 206, either within the text input field 204 or near it.

Figure 4:
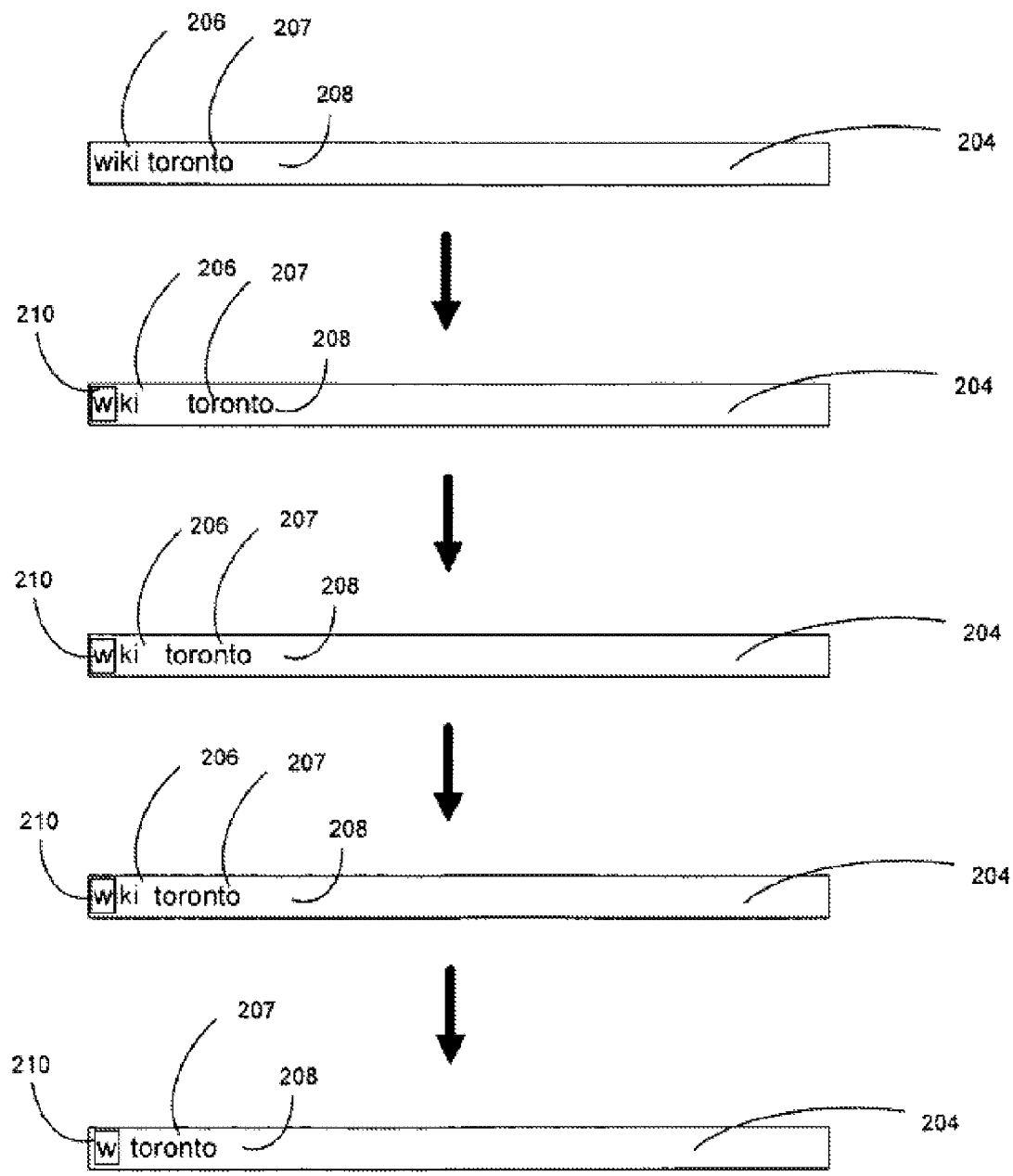
FIG. 4 depicts an example of displaying a character-based abbreviation in response to user entry of a command in a text input field including a transition effect, according to one embodiment of the invention.

Referring now to FIG. 4, there is shown an example where the abbreviation 210 is a standard-font character rather than a logo or stylized character. The abbreviation 210 can be shown in the same typeface as the originally-entered verb 206, or in a slightly different form such as a bold-faced or italicized variant of the same typeface. In the example, the abbreviation 210 is the single letter "w", which replaces the verb "wiki". Since the abbreviation 210 is the first letter of the originally-entered verb 206, the transition effect shown in FIG. 4 has the effect of causing all the letters in the verb 206 to fade out except for the initial "w". At the same time, the noun "toronto" 207 moves to the left to cause spacing to remain consistent and to provide additional space in the text input field 204. As mentioned above, moving the noun 207 in this manner is optional.

Figure 5:
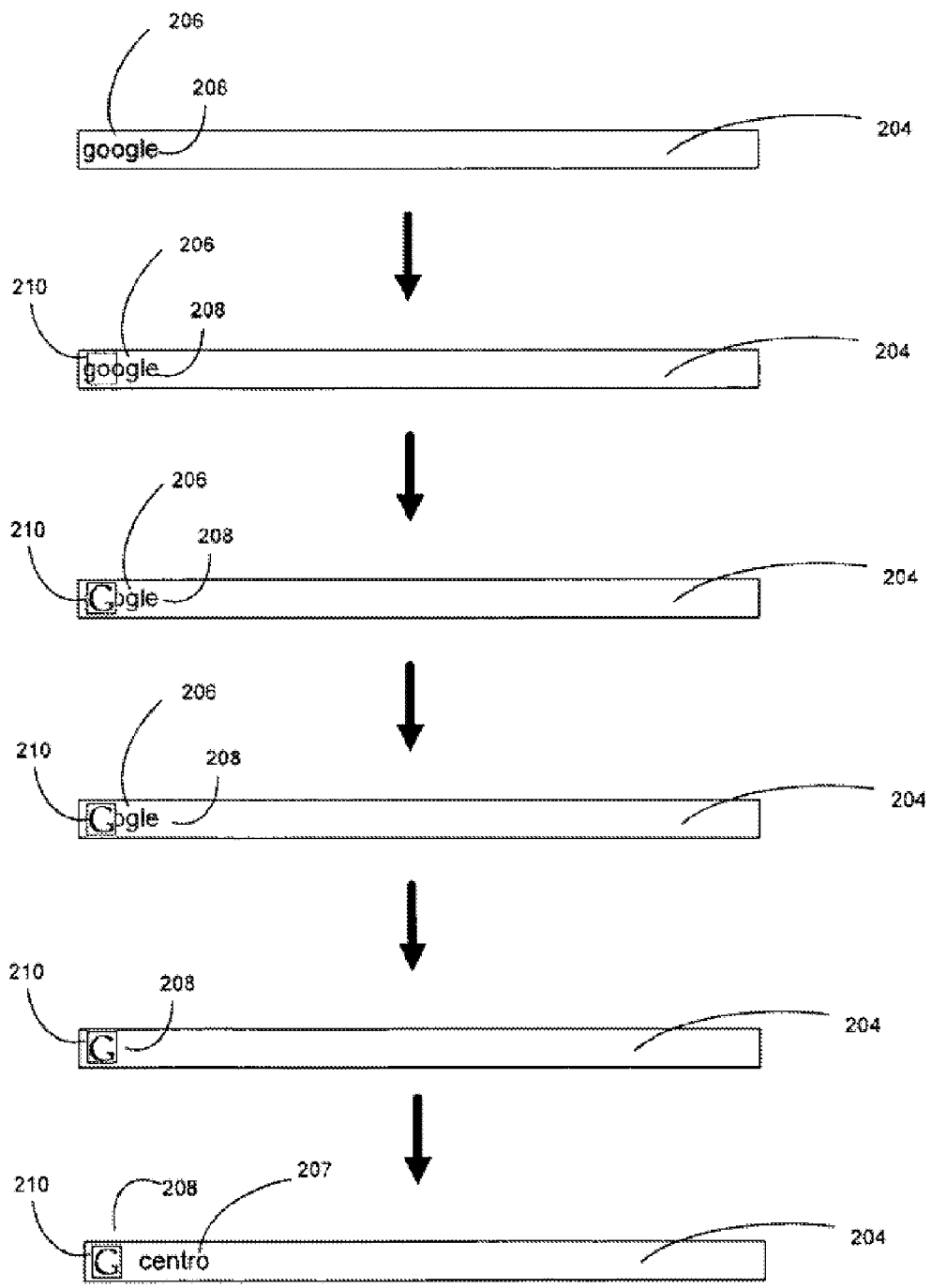
FIG. 5 depicts an example of displaying a graphical abbreviation in response to user entry of a verb portion of a command in a text input field including a transition effect, according to one embodiment of the invention.

In one embodiment, the abbreviation 210 replaces the verb 206 as soon as the user has finished entering the verb 206 in the text input field 204. An example of such an embodiment is shown in FIG. 5. Once the user has entered the verb 206 "google", and before he or she has begun entering a noun, the verb 206 is replaced by the abbreviation 210. As before, a transition effect is shown, although this is optional. The replacement of the verb 206 by the abbreviation 210 can take place in response to any of the following:

- the user enters a space or other delimiting character following entry of a verb 206 (for example, after the user enters "google" followed by a space);
- the user enters a space or other delimiting character following entry of an abbreviation 210 for a verb 206 (for example, after the user enters "g" followed by a space);
- the user enters text that matches a known verb 206 having a corresponding abbreviation 210 (for example, after the user enters "google", which is recognized by the system as a verb 206 having a corresponding abbreviation 210);
- the user enters enough text that the verb 206 can be identified by the characters entered thus far (for example, after the user enters "goo")
- the user pauses for some predetermined length of time during entry of text, and a verb 206 can be identified by the characters entered thus far (for example, after the user enters "goo" and pauses).

In some embodiments, once the user has entered some characters so as to be able to narrow down the number of potentially matching verbs 206, the system may provide a pop-up menu (not shown) from which the user can select the desired verb 206. The pop-up menu can show candidate verbs 206, abbreviations 210, or both.

In some embodiments, once the user has entered some characters so as to be able to identify a likely match, the system may provide auto-complete functionality as is known in the art. The system offers to automatically complete the verb 206, and then the completed verb 206 is replaced by the abbreviation 210. This can take place, for example, immediately upon entry of enough characters that a likely match can be identified, or after a pause in the entry of text.

In one embodiment, the user can continue to enter text in the text input field 204 (for example to provide a noun 207 for the verb), either after the abbreviation 210 has appeared, or during display of the transition. Thus, the user's normal entry of text is unimpeded by the operation of the invention.

Figure 6:
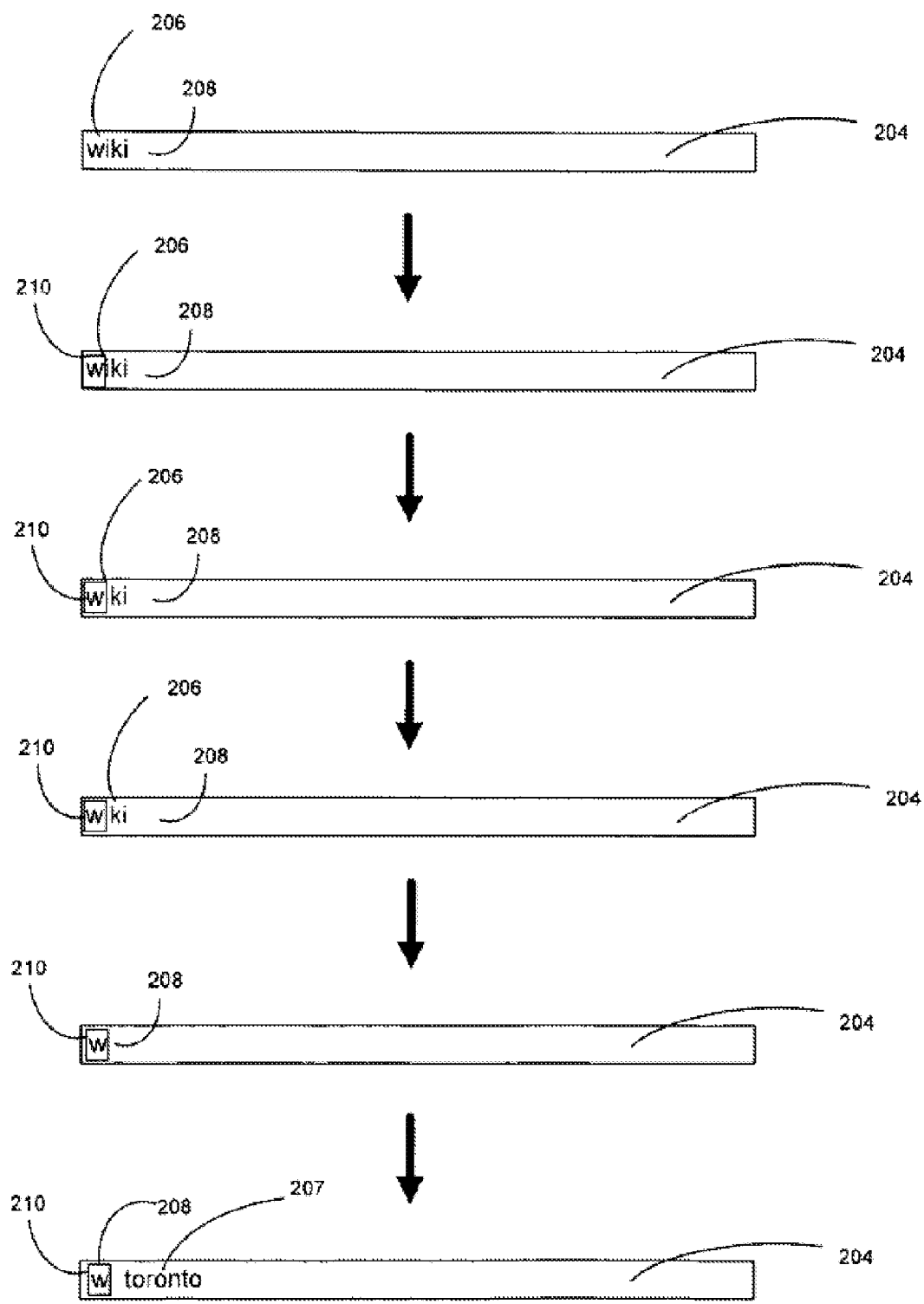
FIG. 6 depicts an example of displaying a character-based abbreviation in response to user entry of a verb portion of a command in a text input field including a transition effect, according to one embodiment of the invention.

Referring now to FIG. 6, there is shown an example of an embodiment wherein the verb 206 is being replaced by an abbreviation 210 upon user entry of a verb 206, wherein the abbreviation 210 is presented in the same font as the verb 206, without a graphic component. In other aspects, the example of FIG. 6 is analogous to that of FIG. 5.

Figure 7:
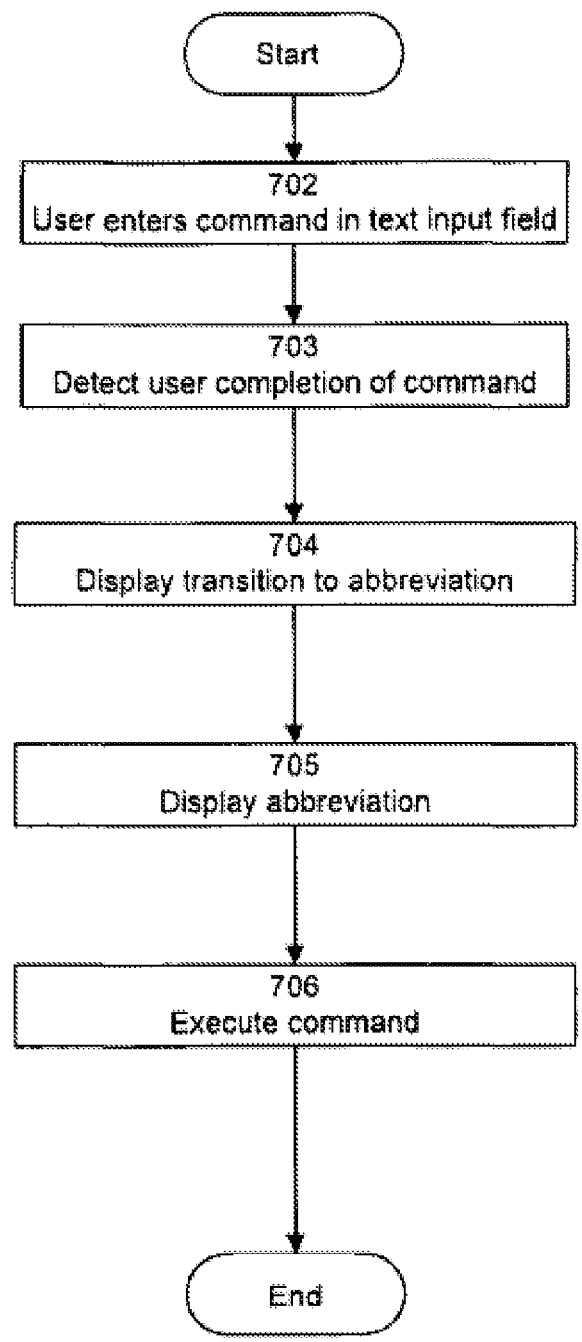
FIG. 7 is a flowchart depicting a method of displaying an abbreviation in response to user entry of a command in a text input field, according to one embodiment of the invention.

Referring now to FIG. 7, there is shown a flowchart depicting a method of the present invention according to one embodiment, wherein an abbreviation 210 is displayed upon detecting that the user has completed entry of a command 208. The user enters 702 the command 208, including a verb 206 and a noun 207, in the text input field 204. The system detects 703 that the user has finished entering the command 208 (for example, when he or she hits an "enter" key, or pauses for some length of time). A transition is displayed 704, wherein the verb portion 206 of the command 208 gradually disappears and the abbreviation 210 gradually appears (as mentioned above, this transition is optional). The abbreviation 210 is displayed 705; the noun 207 remains displayed as well. The specified command is executed 706.

Figure 8:
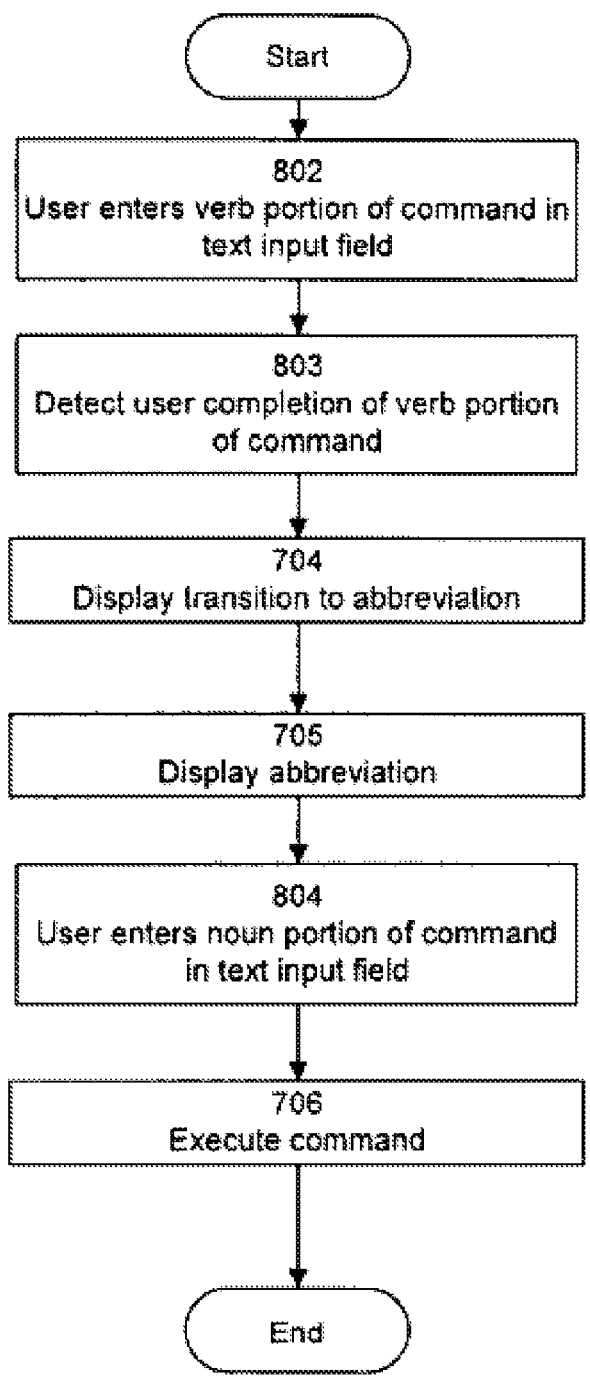
FIG. 8 is a flowchart depicting a method of displaying an abbreviation in response to user entry of a verb portion of a command in a text input field, according to one embodiment of the invention.

Referring now to FIG. 8, there is shown a flowchart depicting a method of the present invention according to one embodiment, wherein an abbreviation 210 is displayed upon detecting that the user has completed entry of verb portion 206 of a command 208. The user enters 802 the verb portion 206 of the command 208 in the text input field 204. The system detects 803 that the user has finished entering the verb portion 206 of the command 208 (for example, when he or she hits the space bar, or pauses for some length of time, or the like). A transition is displayed 704, wherein the verb portion 206 of the command 208 gradually disappears and the abbreviation 210 gradually appears (as mentioned above, this transition is optional). The abbreviation 210 is displayed 705. The user enters 804 the noun portion 207 of the command 208, either during, before, or after the replacement of the verb 206 by the abbreviation 210. The specified command is executed 706.

The display of the abbreviation can be performed in other ways than explicitly described herein. For example and without limitation, in some embodiments the abbreviation can be shown alongside or adjacent to the text input field, or it can be shown in an overlay, tooltip, or according to any other mechanism.

The present invention provides several advantages over prior art techniques. In various embodiments, the invention improves discoverability of keyboard shortcuts, by providing a mechanism for displaying abbreviations that correspond to user-entered text-based commands. By showing the user these abbreviations, the user can learn about such keyboard shortcuts and perhaps use them next time he or she is interested in executing a similar command. Also, displaying a distinctive logo or other graphical element can serve to reinforce branding efforts. Finally, displaying the abbreviation provides positive feedback to reassure the user that the command was entered properly, with proper spelling and syntax.

In one embodiment, the present invention reinforces the use of abbreviations that the user has previously learned. Thus, if the user enters an abbreviation followed by a delimiter (such as a space), the displayed abbreviation is transformed into a stylized version of the abbreviation, so as to reinforce the use of the abbreviation. The transformation can take place immediately upon detection of the delimiter key, although the user can continue to enter the noun or parameter while the transformation takes place. Alternatively, the transformation can take place after the user has entered both the abbreviation and the noun or parameter.

Figure 9:
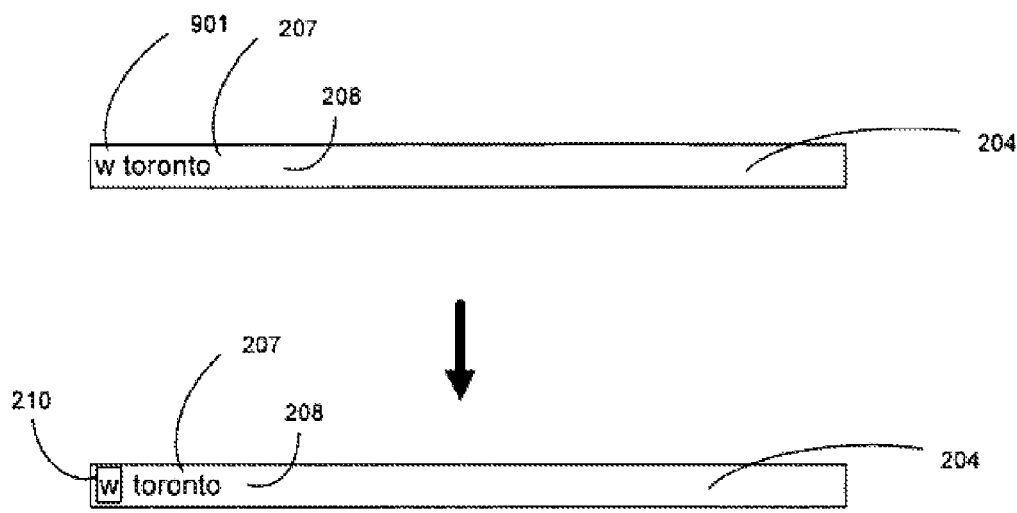
FIG. 9 depicts an example of displaying a stylized character-based abbreviation in response to user entry of a command including an abbreviation in a text input field, according to one embodiment of the invention.

Referring now to FIG. 9, there is shown an example of an embodiment wherein a user-entered abbreviation 901 is transformed into a stylized version of the abbreviation 210. In this example, the transformation takes place after the user has entered both the abbreviation 901 and the noun 207. The transformation can take place gradually, if desired, so that the rectangle around the "w" appears gradually.

Figure 10:
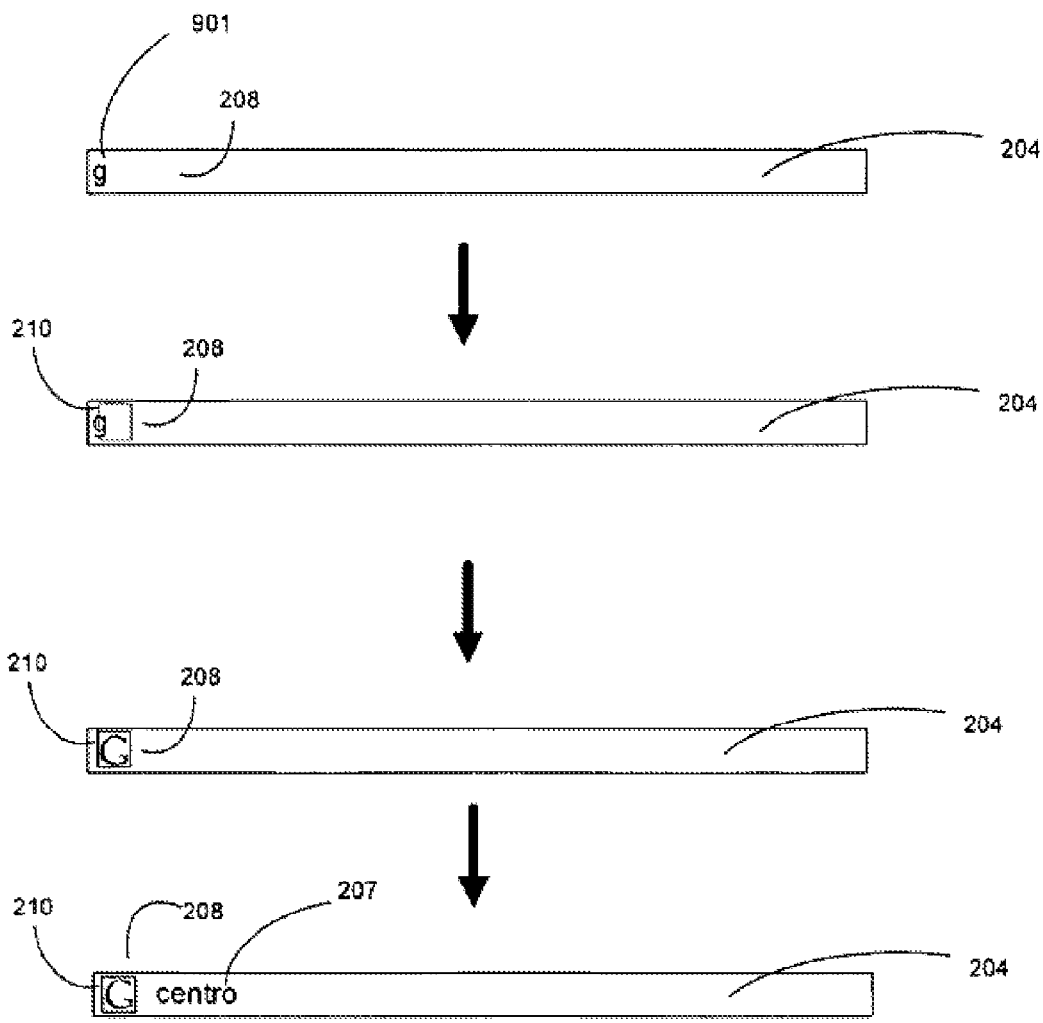
FIG. 10 depicts an example of displaying a stylized character-based abbreviation in response to user entry of an abbreviation for a verb portion of a command in a text input field, according to one embodiment of the invention.

Referring now to FIG. 10, there is shown another example of an embodiment where a user-entered abbreviation 901 is transformed into a stylized version of the abbreviation 210. In this example, the transformation takes place after the user has entered the abbreviation 901 but before entry of the noun 207. Again, the transformation can take place gradually, if desired.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference herein to "one embodiment", "an embodiment", or to "one or more embodiments" means that a particular feature, structure, or characteristic described in connection with the embodiments is included in at least one embodiment of the invention. Further, it is noted that instances of the phrase "in one embodiment" herein are not necessarily all referring to the same embodiment.

Some portions of the above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Further, the computers referred to herein may include a single processor or may be architectures employing multiple processor designs for increased computing capability.

The algorithms and displays presented herein are not inherently related to any particular computer, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A method of operating a computing device, the method being performed by one or more processors and comprising:
   receiving a user input comprising a series of characters representing a command for performing a search, the command including a first portion corresponding to a name of a website to be used to perform the search and a second portion corresponding to one or more parameters of the search;
   displaying, on a display of the computing device, the series of characters representing the command in a command entry field;
   displaying a graphic representation comprising a stylized character-based abbreviation of the name of the website in the command entry field by replacing the first portion of the command with the graphic representation while leaving the second portion of the command unchanged in the command entry field, the replacing comprising displaying a transition effect to gradually introduce the graphic representation in place of the first portion of the command and to remove the first portion of the command, wherein the graphic representation indicates a shortcut that enables entry of a subsequent search command into the command entry field instead of the first portion of the command and wherein the graphic representation is selectable so that when a user selects the graphic representation in the command entry field, the first portion of the command is restored in the command entry field; and
   performing a search corresponding to the command.

2. The method of claim 1, wherein the display is a touch-sensitive display and the user input is received via the touch-sensitive display.

3. The method of claim 1, wherein the graphic representation comprises at least a portion of a logo corresponding to the website.

4. The method of claim 1, wherein receiving the user input comprises receiving the user input via a keyboard.

5. The method of claim 1, wherein displaying the graphic representation of the first portion of the command in the command entry field is performed in response to user completion of the name of the website that represents the first portion of the command.

6. The method of claim 1, wherein displaying the graphic representation of the first portion of the command in the command entry field is performed in response to user completion of one or more characters, of the name of the website that represents the first portion of the command, sufficient to unambiguously identify the name of the website.

7. The method of claim 1, wherein displaying the graphic representation of the first portion of the command in the command entry field is performed in response to the user providing an input indicating completion of entry of the command.

8. The method of claim 1, wherein displaying the graphic representation of the first portion of the command in the command entry field is performed in response to the user pausing for at least a predetermined period of time during input of the series of characters representing the command.

9. A method of operating a computing device, the method being performed by one or more processors and comprising:
   receiving a user input comprising a series of characters representing a command for performing a search, the command including a first portion corresponding to a name of a website to be used to perform the search and a second portion corresponding to one or more parameters of the search;
   displaying, on a display of the computing device, the series of characters representing the command in a command entry field;
   displaying a graphic representation comprising a stylized character-based abbreviation of the name of the website in the command entry field by replacing the first portion of the command with the graphic representation while leaving the second portion of the command unchanged in the command entry field, the replacing comprising displaying a transition effect to gradually introduce the graphic representation in place of the first portion of the command and to remove the first portion of the command, wherein the graphic representation indicates a shortcut that enables entry of a subsequent search command into the command entry field instead of the first portion of the command and wherein the graphic representation is selectable so that when a user selects the graphic representation in the command entry field, the first portion of the command is restored in the command entry field; and
   performing a search corresponding to the command;
   wherein displaying the graphic representation of the first portion occurs substantially simultaneously with performance of the search based on the command.

10. The method of claim 9, wherein the display is a touch-sensitive display and the user input is received via the touch-sensitive display.

11. The method of claim 9, wherein the graphic representation comprises at least a portion of a logo corresponding to the website.

12. The method of claim 9, wherein receiving the user input comprises receiving the user input via a keyboard.

13. A computer program product for operating a computing device, comprising:
   a non-transitory computer-readable medium; and
   computer program code, encoded on the medium, for:
      receiving a user input comprising a series of characters representing a command for performing a search, the command including a first portion corresponding to a name of a website to be used to perform the search and a second portion corresponding to one or more parameters of the search;
      displaying, on a display of the computing device, the series of characters representing the command in a command entry field;
      displaying a graphic representation comprising a stylized character-based abbreviation of the name of the website in the command entry field by replacing the first portion of the command with the graphic representation while leaving the second portion of the command unchanged in the command entry field, the replacing comprising displaying a transition effect to gradually introduce the graphic representation in place of the first portion of the command and to remove the first portion of the command, wherein the graphic representation indicates a shortcut that enables entry of a subsequent search command into the command entry field instead of the first portion of the command and wherein the graphic representation is selectable so that when a user selects the graphic representation in the command entry field, the first portion of the command is restored in the command entry field; and performing a search corresponding to the command.

14. A computing device for receiving a user-entered command, comprising:

an input mechanism for receiving user input;

a display device;

a processor coupled to the input mechanism and the display device; and memory storing one or more programs configured for execution by the processor, the one or more programs comprising instructions to:

receive, via the input mechanism, a user input comprising a series of characters representing a command for performing a search, the command including a first portion corresponding to a name of a website to be used to perform the search and a second portion corresponding to one or more parameters of the search;

display, on the display device, the series of characters representing the command in a command entry field;

display a graphic representation comprising a stylized character-based abbreviation of the name of the website in the command entry field by replacing the first portion of the command with the graphic representation while leaving the second portion of the command unchanged in the command entry field, the replacing comprising displaying a transition effect to gradually introduce the graphic representation in place of the first portion of the command and to remove the first portion of the command, wherein the graphic representation indicates a shortcut that enables entry of a subsequent search command into the command entry field instead of the first portion of the command and wherein the graphic representation is selectable so that when a user selects the graphic representation in the command entry field, the first portion of the command is restored in the command entry field; and perform a search corresponding to the command.

15. The computing device of claim 14, wherein the display is a touch-sensitive display, and wherein the input mechanism is a part of the touch-sensitive display.

16. The computing device of claim 14, wherein the graphic representation comprises at least a portion of a logo corresponding to the website.

17. The computing device of claim 14, wherein the instructions to display the graphic representation of the first portion of the command comprise instructions to display the graphic representation in the command entry field in response to user completion of the name of the website that represents the first portion of the command.

18. The computing device of claim 14, wherein the instructions to display the graphic representation of the first portion of the command comprise instructions to display the graphic representation in the command entry field in response to the user providing an input indicating completion of entry of the command.

* * * * *